(12) United States Patent  
Peterson et al.

(10) Patent No.: US 8,883,676 B1  
(45) Date of Patent: Nov. 11, 2014

(54) REMOVAL OF TOXIC CHEMICALS USING METAL-ORGANIC FRAMEWORKS (MOFS) POST-TREATED VIA PLASMA-ENHANCED CHEMICAL VAPOR DEPOSITION (PECVD) WITH FLUOROCARBONS

(71) Applicant: U.S. Army Research Development and Engineering Command, APG, MD (US)

(72) Inventors: Gregory W Peterson, Belcamp, MD (US); Jared B. DeCoste, Baltimore, MD (US); Martin W. Smith, Salisbury (GB); Corinne A. Stone, Salisbury (GB); Colin R. Willis, Salisbury (GB)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 154 days.

(21) Appl. No.: 13/736,313

(22) Filed: Jan. 8, 2013

(51) Int. Cl.
*B01J 23/70* (2006.01)
*B01J 20/22* (2006.01)

(52) U.S. Cl.
CPC .................................... *B01J 20/226* (2013.01)
USPC ........................................................ 502/401

(58) Field of Classification Search
CPC ..................................................... B01J 20/226
USPC ........................................................ 502/401
See application file for complete search history.

(56) References Cited

U.S. PATENT DOCUMENTS

2010/0024643 A1   2/2010   Bradley

OTHER PUBLICATIONS

Decoste, Jared, Enhanced Stability of Cu-BTC via Perfluorohexana Plasma Enhanced Chemical Vapor Deposition, J.Am. Chem. Soc. Jan. 9, 2012, American Chemical Society.

*Primary Examiner* — Colleen Dunn
*Assistant Examiner* — Haytham Soliman
(74) *Attorney, Agent, or Firm* — Ulysses John Biffoni

(57) ABSTRACT

A system and method of filtering comprising adsorbing a toxic chemical using a metal-organic framework (MOF) compound that has been post-treated with fluorocarbons using plasma-enhanced chemical vapor deposition (PECVD). The toxic chemical may comprise any of ammonia and cyanogen chloride. Furthermore, the toxic chemical may comprise any of an acidic/acid-forming gas, basic/base-forming gas, oxidizer, reducer, and organic gas/vapor. The toxic chemical is physically adsorbed by the MOF compound. Moreover, the toxic chemical interacts with unsaturated metal sites within the MOF. Additionally, the MOF compound may comprise any of Cu-BTC, MOF-177, and an isoreticular metal-organic framework (IRMOF) compound. The MOF compound may comprise a metal-carboxylate bond. Additionally, the MOF compound may be unstable in the presence of moisture.

16 Claims, 3 Drawing Sheets

REMOVAL OF TOXIC CHEMICALS USING METAL-ORGANIC FRAMEWORKS (MOFS) POST-TREATED VIA PLASMA-ENHANCED CHEMICAL VAPOR DEPOSITION (PECVD) WITH FLUOROCARBONS

GOVERNMENT INTEREST

The invention described herein may be manufactured, used, and/or licensed, by or for the United States Government.

BACKGROUND

1. Technical Field

The embodiments herein generally relate to filtration media, and more particularly to metal-organic frameworks (MOFs), and the process of removing toxic chemicals, such as ammonia, using plasma-enhanced fluorocarbon MOFs.

2. Description of the Related Art

Sorbents are currently employed in numerous fields, including gas (e.g. hydrogen, carbon dioxide, methane)/liquid storage and separations, as well as filtration. Current military and first responder respirator and building filters typically employ activated, impregnated carbons for the removal of toxic chemicals, including chemical warfare agents (e.g. GB, GD, VX, HD, etc) and toxic industrial chemicals (e.g. ammonia, chlorine, hydrogen chloride, sulfur dioxide). In filters, the adsorbent is housed in a structure such that a toxic gas stream passes through a packed bed, monolith, or volume such that the toxic gas contacts the adsorption media and is removed by physical adsorption and/or chemical reaction. Although activated carbon is an excellent adsorbent for the removal of toxic chemicals, it can fall short in areas involving the removal of a full spectrum of toxic chemicals. Impregnants may initially be active towards many classes of toxic chemicals; however, when exposed to variant temperature and humidity, impregnants may interact with one another, causing aging and degradation of activity.

MOFs are a relatively new class of porous materials comprised of metal centers (or clusters) and organic linkers. These can be visualized as a series of joints (metal clusters) and struts (organic linkers) that form an extended, porous network. A wide variety of MOFs are available by interchanging the metal cluster and organic linkers. Moreover, MOFs are tailorable such that they can be designed from the "bottom-up" on a molecular level. MOFs can be made into 12-, and 3-dimensional structures. Although MOFs are incredibly attractive for a variety of applications, many, most notably those containing carboxylate ligands, are air sensitive. Specifically, many degrade in the presence of nucleophiles such as water (liquid or humid air) due to hydrolysis or ammonia due to aminolysis of the MOF structure as described by Peterson, G. W., et al., "Ammonia Vapor Removal by Cu(3)(BTC)(2) and Its Characterization by MAS NMR," J. Phys. Chem. C, vol. 113, pp. 13906-13917 (2009), the complete disclosure of which in its entirety, is herein incorporated by reference. Many efforts have focused on developing MOFs that are air-stable and water-stable. Most of these efforts focus on changing the type of metal or type of linker such that stronger bonds result or moisture is repelled. Examples of this include creating MOFs comprised of zirconium and titanium metal centers, which result in metal clusters that are more stable, as described by Cavka, J., et al., "A New Zirconium Inorganic Building Brick Forming Metal Organic Frameworks with Exceptional Stability," J. Am. Chem. Soc., col 130, pp. 13850-13851 (2008), the complete disclosure of which in its entirety, is herein incorporated by reference.

Linkers have also been changed by using cyclic organics containing nitrogen instead of carboxylic groups, and hanging hydrophobic functional groups from the linker to repel water. Generally, in all cases, these modifications result in an inherent change to the MOF structure, porosity, and other physical characteristics. Therefore, it is desirable to develop a technique that does not change the structure of the MOF while retaining the inherent characteristics of the MOF.

Additionally, the process of treating surfaces and microporous materials such as activated carbon and silica using plasma techniques have previously been described in U.S. Patent Application Publication No. 2010/0024643 published to Robert Harold Bradley on Feb. 4, 2010, the complete disclosure of which, in its entirety, is herein incorporated by reference. The disclosed process is aimed at changing the diffusion and wetting properties of the materials. Additionally, the publication describes increasing the hydrophobicity of materials to reduce moisture uptake.

SUMMARY

In view of the foregoing, an embodiment herein provides a method of filtering comprising providing a toxic chemical at a location; providing a metal-organic framework (MOF) compound post-treated with fluorocarbons using plasma-enhanced chemical vapor deposition; contacting the MOF compound to the toxic chemical; and filtering the toxic chemical from the location. The toxic chemical may comprise any of ammonia and cyanogen chloride. Furthermore, the toxic chemical may comprise any of an acidic/acid-forming gas, basic/base-forming gas, oxidizer, reducer, and organic gas/vapor. Preferably, the toxic chemical is physically adsorbed by the MOF compound. Moreover, the toxic chemical interacts with unsaturated metal sites within the MOF. Additionally, the MOF compound may comprise any of Cu-BTC, MOF-177, and an isoreticular metal-organic framework (IR-MOF) compound. In one embodiment, the MOF compound may comprise a metal-carboxylate bond. Additionally, the MOF compound may be unstable in the presence of moisture.

Another embodiment provides a method comprising adsorbing a toxic chemical using a MOF compound that has been post-treated using plasma-enhanced chemical vapor deposition. Still another embodiment provides a system for filtering toxic chemicals, wherein the system comprises a filter that is exposed to a toxic chemical, wherein the filter comprises a MOF compound that has been post-synthetically treated with fluorocarbons using plasma-enhanced chemical vapor deposition, and wherein the MOF compound adsorbs the toxic chemical.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
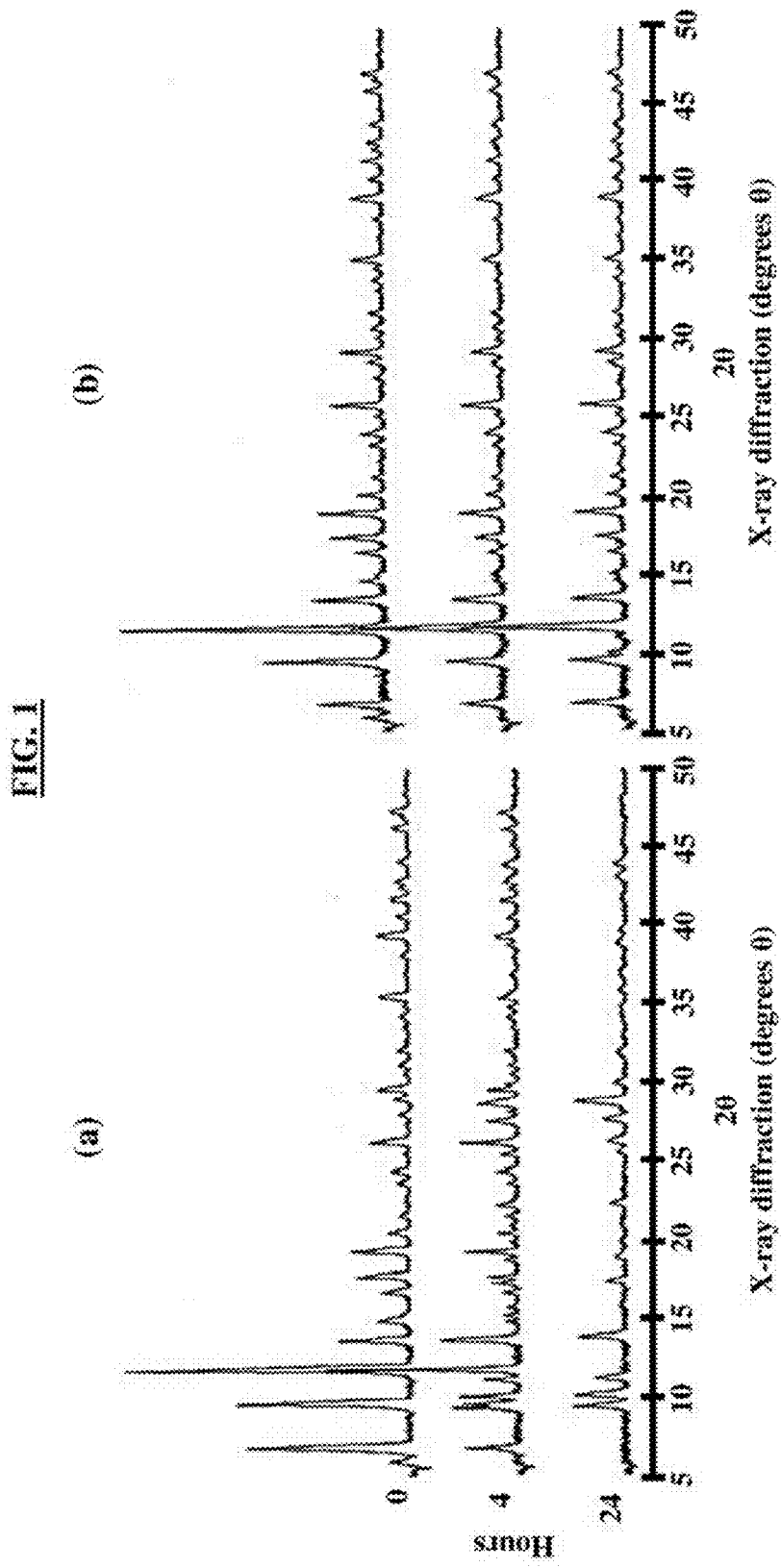
FIG. 1 is a graphical illustration of powder x-ray diffraction (PXRD) patterns for (a) Cu-BTC (e.g., also referred to as $Cu_3(BTC)_2$ and HKUST-1) and (b) Cu-BTC Plasma after immersion in water at room temperature for 0, 4, and 24 hours, respectively, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a process for removing ammonia and other toxic chemicals using MOFs post-treated with fluorocarbons through plasma-enhanced chemical vapor deposition (PECVD). Referring now to the drawings, and more particularly to FIGS. 1 through 4, where similar reference characters denote corresponding features consistently throughout the figures, there are shown preferred embodiments.

The embodiments herein utilize fluorocarbons for post-treating MOFs. The carbon-fluorine (C—F) bonds that are found in the fluorocarbons have bond energies ≈485 KJ/mol rising from the high electronegativity of fluorine imposing a partial ionic character to the C—F bond. Furthermore, multiple C—F bonds strengthen the carbon-carbon (C—C) bonds found in the backbone of fluorocarbons through the inductive effect. The high electronegativity of fluorine does not allow for high amounts of polarizability, which means that fluorocarbons have very weak London dispersion forces and as a result low intermolecular forces. These low intermolecular attractive forces cause fluorocarbons to be hydrophobic.

Furthermore, the embodiments herein utilize PECVD for post-treating the MOFs. The process of post-treating the MOFs using PECVD can occur similar to the manner in which perfluoroalkanes are used to deposit a polymer on a surface to impart various diffusional and wetting characteristics to surfaces and around the pore openings of microporous materials. Other deposition techniques such as continuous discharge, afterglow deposition, and modulated flow discharges could be used to control properties such as film thickness and the degree of crosslinking of polymer chains to one another. A fluorocarbon plasma is populated by $CF_{1-3}$ radicals, C and F atoms (it could be large fragments the size of the original fluorocarbon), and other ions produced by the fragmentation of the fluorocarbon. These species can interact with the surface of the material, or escape the plasma and penetrate the pores of the material. After the surfaces are populated with fluorocarbon species, other fluorocarbons can easily diffuse across the surface or into the pores. Experiments have been conducted to deposit the fluorocarbons without using plasma, but they have not been successful.

The embodiments herein provide a technique for the removal of ammonia and other toxic chemicals using MOFs that have been treated with plasma-modified fluorocarbons to stabilize the materials against water and other chemicals that are known to degrade MOFs. Specifically, in one embodiment, Cu-BTC MOF is treated with plasma-modified perfluorohexane (PFH). The resulting material includes Cu-BTC whose surfaces (inside and outside of the pores) is populated with $CF_3$ groups, as well as free PFH on the surface and in the pores. One aspect of the embodiments herein is that the reactive $CF_3$ species created from the plasma diffuse across the plasma-solid interface and eventually into the pores to react with the internal surface. As the internal pores are populated with nonperiodic $CF_3$ groups, the diffusion of PFH becomes more favorable. As PFH vapor continues to be introduced, even after the reactor is turned off, it diffuses into the pores. In another alternative embodiment, the Cu-BTC MOF is treated with other chemicals including a wide range of perfluorocarbon precursors such as fluoroalkane as well as 1H, 1H, 2H, 2H-Perfluorohexyl acrylate (PFAC4) and tetrafluoromethane.

The properties of the resulting material include enhanced structural stability towards water vapor and liquid water. FIG. 1 illustrates the x-ray diffraction patterns for the (a) structure of Cu-BTC before and after exposure to liquid water, and (b) structure of Cu-BTC treated via PECVD/PFA (PECVD/perfluoroalkoxy) before and after exposure to liquid water. More specifically, FIG. 1 is a graphical illustration of PXRD patterns for (a) Cu-BTC and (b) Cu-BTC Plasma after immersion in water at room temperature for 0, 4, and 24 hours, respectively, according to an embodiment herein. The PXRD patterns shown in FIG. 1 illustrate that the crystallinity is retained for the treated Cu-BTC for submersion in water for 24 hours, while the crystallinity is not maintained and breakdown occurs for untreated Cu-BTC.

Figure 2:
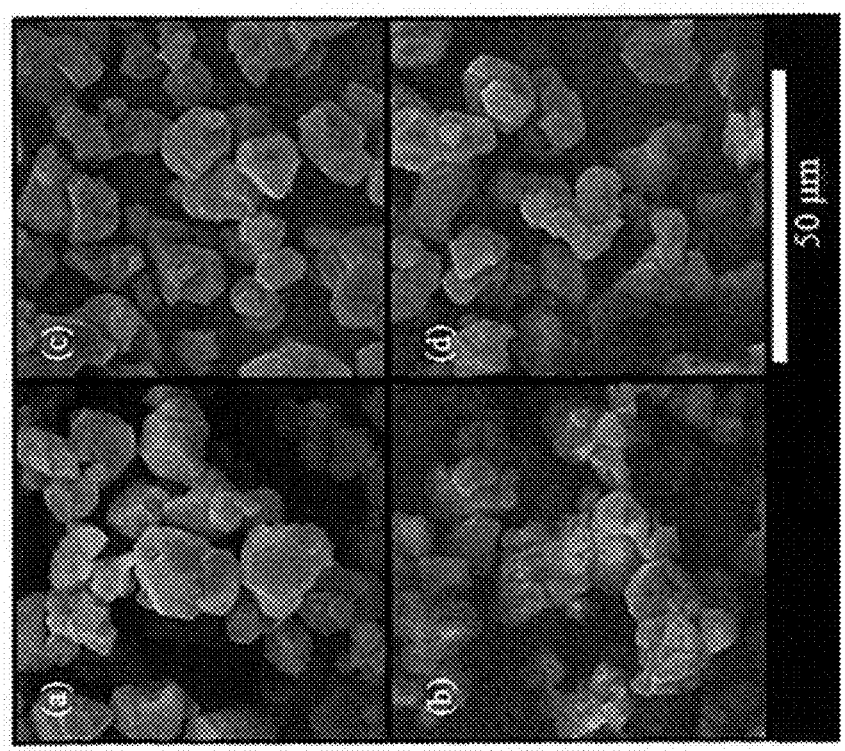
FIG. 2 illustrates scanning electron microscope (SEM) images of (a) Cu-BTC, (b) Cu-BTC after exposure to 90% humidity, (c) Cu-BTC Plasma, and (d) Cu-BTC Plasma after exposure to 90% humidity according to an embodiment herein.

FIG. 2 shows the SEM images of the untreated and treated Cu-BTC samples before and after exposure to 90% relative humidity (RH) for 24 hours. More specifically, FIG. 2 illustrates SEM images of (a) Cu-BTC, (b) Cu-BTC after exposure to 90% humidity, (c) Cu-BTC Plasma, and (d) Cu-BTC Plasma after exposure to 90% humidity according to an embodiment herein. In Cu-BTC it can be seen that the crystal shows cracking of its surfaces and other irregularities forming, while the treated Cu-BTC is able to maintain smooth surfaces without noticeable surface cracking. Grand canonical Monte Carlo (GCMC) simulation of PFH absorption in Cu-BC demonstrates that PFH occupies sites in the large Cu-BTC pores. This hydrophobic nature of PFH prevents large water clusters from forming in Cu-BTC thereby preventing the hydrolysis/degradation mechanism from occurring, and thus maintaining the structural integrity of the MOFs.

The treated Cu-BTC sample demonstrates the ability to enhance the already high uptake ability of Cu-BTC as can be seen in the Table 1 below:

Table 1: $NH_3$ Capacities of Cu-BTC and Cu-BTC Plasma

TABLE 1

NH$_3$ Capacities of Cu-BTC and Cu-BTC Plasma

| Conditions | Cu-BTC | Cu-BTC Plasma |
|---|---|---|
| 0% RH | 6.4 mol/kg | 8.7 mol/kg |
| 80% RH | 10.4 mol/kg | 11.8 mol/kg |

As indicated above, the addition of the PFH plasma does not diminish the overall capacity of Cu-BTC for ammonia, as would be expected based purely on pore filling and diminished surface area. The enhancement in ammonia capacity by PFH plasma can best be explained by the increased stability of Cu-BTC at both RH conditions tested. The resulting stability slows and/or eliminates the collapse of the pore structure and increases the ability to maintain more of its crystallinity in the presence of ammonia and/or water. The enhancement of stability occurs from the ability of PFH to prevent the formation of water and/or ammonia clusters around the Cu sites as well as the ability of PFH to act as a strut to prevent the collapsing of pores through the destruction of copper-carboxylate bonds.

Additional testing has also been conducted on cyanogen chloride. Although the humid capacity is relatively low for both the baseline Cu-BTC and Cu-BTC Plasma, the dry capacity is enhanced through the plasma treatment. Furthermore, additional types of MOFs may be used for toxic chemical removal after plasma treatment including MOFs such as an isoreticular metal-organic framework (IRMOF-1 (MOF-5)) and MOF-177, which are structurally different from one another as well as Cu-BTC.

As previously indicated, U.S. Patent Application Publication No. 2010/0024643 describes changing the diffusion and wetting properties of materials, and increasing the hydrophobicity of materials to reduce moisture uptake. Conversely, according to the embodiments herein, moisture uptake may actually increase due to the stabilization, and therefore hydrophobicity is not increased.

Figure 3:
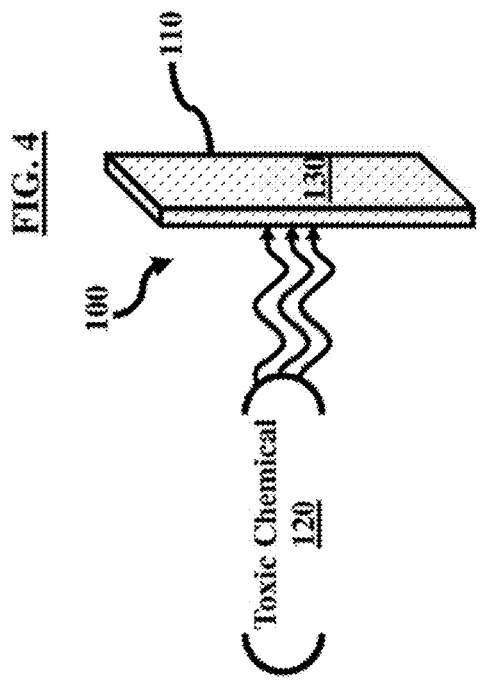
FIG. 3 is a flow diagram illustrating a method according to an embodiment herein.

FIG. 3, with reference to FIGS. 1 and 2, is a flow diagram illustrating a method of filtering according to an embodiment herein. The method comprises providing (50) a toxic chemical at a location; providing (52) a MOF compound post-treated with fluorocarbons using plasma-enhanced chemical vapor deposition; contacting (54) the MOF compound to the toxic chemical; and filtering (56) the toxic chemical from the location. The toxic chemical may comprise any of ammonia and cyanogen chloride. Furthermore, the toxic chemical may comprise any of an acidic/acid-forming gas, basic/base-forming gas, oxidizer, reducer, and organic gas/vapor. Preferably, the toxic chemical is physically adsorbed by the MOF compound. Moreover, the toxic chemical interacts with unsaturated metal sites within the MOF. Additionally, the MOF compound may comprise any of Cu-BTC, MOF-177, and an isoreticular metal-organic framework (IRMOF) compound. In one embodiment, the MOF compound may comprise a metal-carboxylate bond. Additionally, the MOF compound may be unstable in the presence of moisture.

Figure 4:
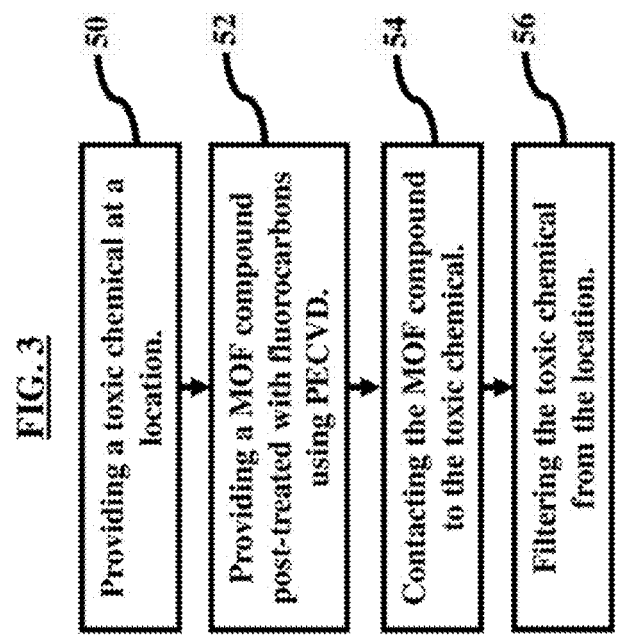
FIG. 4 illustrates a schematic diagram of a system of filtering according to an embodiment herein.

FIG. 4, with reference to FIGS. 1 through 3, illustrates a system 100 for filtering toxic chemicals 120 according to an embodiment herein. The system 100 comprises a filter 110 that is exposed to a toxic chemical 120, wherein the filter 110 comprises a MOF compound 130 that has been post-synthetically treated with fluorocarbons using PECVD, and wherein the MOF compound 130 adsorbs the toxic chemical 120. The filter 110 depicted in FIG. 4 illustrates just one example configuration of a filter that could be used in accordance with the embodiments herein. However, other embodiments of the filter are possible including gas mask filters, filter canisters, among others, and the embodiments herein are not restricted to a particular type or configuration of filter.

The embodiments herein may be used in various fields including respirators and/or collective protection filters; however, other types of applications such as air and water purification systems, gas separation systems, gas storage, aqueous catalysis and/or reactions in/with MOFs, and sensor technologies may also be configured for use in accordance with the embodiments herein. Several MOFs are excellent candidates for carbon dioxide ($CO_2$) removal; however, water is selectively adsorbed to the structures. Treating the surface with PECVD of perfluorocarbons may allow $CO_2$ to preferentially adsorb to the material.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of filtering toxic chemicals, said method comprising:
   treating a metal organic framework (MOF) compound with fluorocarbons using plasma enhanced chemical vapor deposition;
   contacting said toxic chemical to said MOF compound; and thereby filtering said toxic chemical.

2. The method of claim 1, wherein said toxic chemical comprises any of ammonia and cyanogen chloride.

3. The method of claim 1, wherein said toxic chemical comprises any of an acidic/acid-forming gas, basic/base-forming gas, oxidizer, reducer, and organic gas/vapor.

4. The method of claim 1, wherein said toxic chemical is physically adsorbed by said MOF compound.

5. The method of claim 1, wherein said toxic chemical interacts with unsaturated metal sites within said MOF.

6. The method of claim 1, wherein said MOF compound comprises any of Cu-BTC, MOF-177, and an isoreticular metal-organic framework (IRMOF) compound.

7. The method of claim 1, wherein said MOF compound comprises a metal-carboxylate bond.

8. The method of claim 1, wherein said MOF compound is unstable in a presence of moisture.

9. A method comprising adsorbing a toxic chemical using a metal-organic framework (MOF) compound that has been post-treated using plasma-enhanced chemical vapor deposition.

10. The method of claim 9, wherein said toxic chemical comprises any of ammonia and cyanogen chloride.

11. The method of claim 9, wherein said toxic chemical comprises any of an acidic/acid-forming gas, basic/base-forming gas, oxidizer, reducer, and organic gas/vapor.

12. The method of claim 9, wherein said toxic chemical is physically adsorbed by said MOF compound.

13. The method of claim 9, wherein said toxic chemical interacts with unsaturated metal sites.

14. The method of claim 9, wherein said MOF compound comprises any of Cu-BTC, MOF-177, and an isoreticular metal-organic framework (IRMOF) compound.

15. The method of claim 9, wherein said MOF compound comprises a metal-carboxylate bond.

16. The method of claim 9, wherein said MOF compound is unstable in a presence of moisture.

* * * * *